H. A. HARRAH.
TRACTOR.
APPLICATION FILED FEB. 23, 1918.
1,384,951.
Patented July 19, 1921.
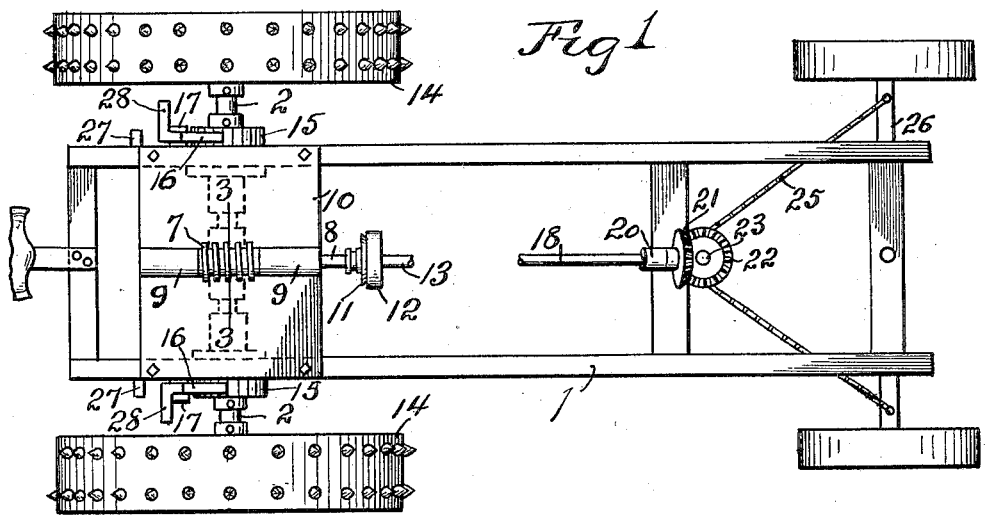
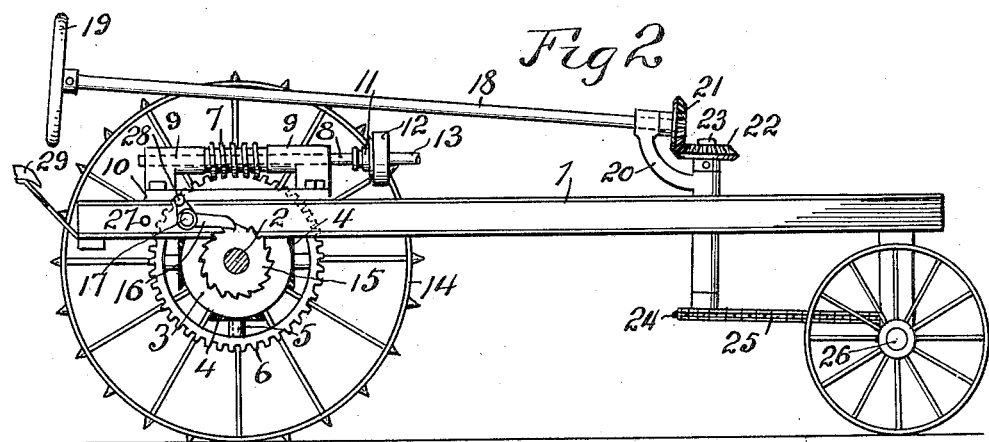
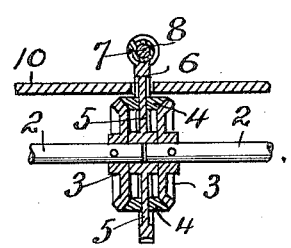
WITNESS:
R.E. Hamilton
INVENTOR.
Hillis A. Harrah,
BY
Warren D. House,
His ATTORNEY

UNITED STATES PATENT OFFICE.

HILLIS A. HARRAH, OF POMONA, KANSAS, ASSIGNOR OF ONE-HALF TO LIZZIE T. LEIMBACH, OF ROSEDALE, KANSAS.

TRACTOR.

1,384,951. Specification of Letters Patent. Patented July 19, 1921.

Application filed February 23, 1918. Serial No. 218,612.

*To all whom it may concern:*

Be it known that I, HILLIS A. HARRAH, a citizen of the United States, residing at Pomona, in the county of Franklin and State of Kansas, have invented a certain new and useful Improvement in Tractors, of which the following is a specification.

My invention relates to improvements in tractors.

One of the objects of my invention is to provide a tractor with novel means by which the tractor may be sharply turned in either direction, which is simple in construction, cheap to manufacture, durable, not liable to get out of order, which is entirely automatic in operation, and which, when desired, may be quickly rendered inoperative or as quickly placed in operative condition.

The novel features of my invention are hereinafter fully described and claimed.

In the accompanying drawing, which illustrates the preferred embodiment of my invention, Figure 1 is a plan view, partly broken away, of a tractor provided with my improvement, parts of the tractor being removed.

Fig. 2 is a side elevation of the mechanism shown in Fig. 1.

Fig. 3 is a vertical sectional view on the line 3—3 of Fig. 1.

Similar reference characters designate similar parts in the different views.

1 designates the main frame of a tractor mounted on the usual two rotary driving members or shafts 2, the latter being connected with and driven by differential driving mechanism of the usual type comprising two bevel gear wheels 3, Fig. 3, respectively secured to the shafts 2 and meshing with bevel gear wheels 4, operating as intermediate gear wheels and respectively rotatably mounted on spokes 5 of a master worm driving wheel 6, which is rotatably mounted on the shafts 2 and which meshes with a worm 7, which is secured to and rotatable with a central longitudinal shaft 8, rotatable in bearings 9, which are supported on a horizontal plate 10, which is supported by the frame 1.

Splined on the shaft 8 is a clutch member 11 which is adapted to be moved into and out of driving engagement with a clutch member 12, which is secured to and rotatable with the driving shaft 13 of the tractor engine, not shown.

14 designates the usual traction wheels, which are rigidly secured to and rotatable with the shafts 2.

Rigidly secured to the shafts 2 respectively are two ratchet wheels 15 which are normally respectively automatically engaged with two gravity actuated pawls 16, respectively pivotally mounted on two transverse pins 17 which exend horizontally outwardly from opposite sides respectively of the frame 1.

The arrangement of the pawls 16 and the teeth of the ratchet wheels 15 is such that the pawls will hold the ratchet wheels from turning backwardly, but will permit them to turn forwardly.

18 designates the usual longitudinal inclined steering rod having secured to its rear end a steering wheel 19, and rotatably mounted in a bracket 20, which is supported upon the frame 1. Rigidly secured to the forward end of the steering rod 18 is a bevel gear wheel 21, which meshes with a bevel gear wheel 22 secured to the upper end of a substantially upright shaft 23, rotatably mounted in the bracket 20 and having secured to its lower end a sprocket wheel 24 on which is mounted a sprocket chain 25, the forward ends of which are secured to the front axle 26 at opposite sides of the axis thereof.

In the operation of my invention, if it is desired to make a sharp turn to the right, the operator manipulates the steering wheel 19 in the usual manner required to turn the front axle in the right direction. The driving action of the master worm wheel 6 will be transmitted to the left traction wheel through the gears 4, left gear 3 and left shaft 2. The left pawl 16 will slip over the adjacent ratchet wheel 15, while the right pawl 16 will hold the right ratchet wheel 15 from turning backwardly.

Upon turning to the left, the right pawl 16 will slip over the ratchet wheel, and the left pawl 16 will engage the left ratchet wheel 15 and hold it from turning backwardly. The traction wheel which is held from turning backwardly serves as a pivot around which the tractor swings in making the turn. As a result of this arrangement, very sharp turns can be made. The action is entirely automatic, so that no extra effort is required on the part of the operator.

If desired, the pawls 16 may be released from the ratchet wheels 15 and swung upwardly and rearwardly so as to respectively rest upon two pins 27 extending outwardly horizontally from the frame 1 at the rear of the pins 17 respectively. For convenience in swinging the pawls 16 to and from their operative positions, each pawl may be provided with a laterally extending crank arm 28. These crank arms may be manipulated by the feet of the operator, who occupies a seat 29 which is at the rear of and supported by the end of the frame 1.

I do not limit my invention to the structure shown and described, as modifications, within the scope of the appended claims, may be made without departing from the spirit of my invention.

What I claim is:—

1. In a tractor having two rotary driving members, differential driving mechanism connecting said members, and two traction wheels respectively driven by said members, the combination with one of said driving members, of automatically actuated means for holding the last named member from turning backwardly, but which in the operative position permits it to turn forwardly.

2. In a tractor having two rotary driving members, differential driving mechanism connecting said members, and two traction wheels respectively driven by said members, the combination with one of said driving members, of releasable automatically actuated means for holding the last named member from turning backwardly, but which in the operative position permits it to turn forwardly.

3. In a tractor having two rotary driving members, differential driving mechanism connecting said members, and two traction wheels respectively driven by said members, a ratchet wheel revoluble with one of said members, and a pawl normally automatically engaged with said ratchet wheel and arranged to hold the ratchet wheel from turning backwardly but which in the operative position permits it to turn forwardly.

4. In a tractor having two rotary driving members, differential driving mechanism connecting said members, and two traction wheels respectively driven by said members, a ratchet wheel revoluble with one of said members, and a releasable pawl normally automatically engaged with said ratchet wheel and arranged to hold the ratchet wheel from turning rearwardly but which in the operative position permits it to turn forwardly.

5. In a tractor having two rotary driving members, differential driving mechanism connecting said members, and two traction wheels respectively driven by said members, and independent automatically actuated means for holding said members from turning backwardly, but which when in the operative position permits them to turn forwardly.

6. In a tractor having two rotary driving members, differential driving mechanism connecting said members, and two traction wheels respectively driven by said members, and releasable independent automatically actuated means for holding said members from turning backwardly, but which in the operative position permit them to turn forwardly.

7. In a tractor, having two rotary driving members, differential driving mechanism connecting said members, and two traction wheels respectively driven by said members, two ratchet wheels respectively revoluble with said members, and two pawls normally automatically engaged with said ratchet wheels respectively and arranged to hold said ratchet wheels from turning backwardly but permitting them in the operative position to turn forwardly.

8. In a tractor having two rotary driving members, differential driving mechanism connecting said members, and two traction wheels respectively driven by said members, two ratchet wheels respectively revoluble with said members, and two releasable pawls automatically engaged with said ratchet wheels respectively and arranged to hold said wheels from turning backwardly but permitting them in the operative position to turn forwardly.

In testimony whereof I have signed my name to this specification.

HILLIS A. HARRAH.